US011685606B2

(12) United States Patent
Risser et al.

(10) Patent No.: US 11,685,606 B2
(45) Date of Patent: Jun. 27, 2023

(54) TUBE CONVEYOR SYSTEM

(71) Applicant: Valco Industries, Inc., New Holland, PA (US)

(72) Inventors: Philip E. Risser, Leola, PA (US); Logan Auker, Ephrata, PA (US); Jacob D. Byer, Coldwater, OH (US)

(73) Assignee: Valco Industries, Inc., New Holland, PA (US)

( * ) Notice: Subject to any disclaimer, the term of this patent is extended or adjusted under 35 U.S.C. 154(b) by 0 days.

(21) Appl. No.: 17/484,229

(22) Filed: Sep. 24, 2021

(65) Prior Publication Data

US 2022/0097974 A1    Mar. 31, 2022

Related U.S. Application Data

(60) Provisional application No. 63/083,302, filed on Sep. 25, 2020.

(51) Int. Cl.
| | |
|---|---|
| *B65G 15/08* | (2006.01) |
| *B65G 15/30* | (2006.01) |
| *B65G 15/60* | (2006.01) |
| *B65G 47/16* | (2006.01) |
| *B65G 47/82* | (2006.01) |
| *B65G 47/58* | (2006.01) |

(52) U.S. Cl.
CPC ............ *B65G 15/08* (2013.01); *B65G 15/30* (2013.01); *B65G 15/60* (2013.01); *B65G 47/16* (2013.01); *B65G 47/58* (2013.01); *B65G 47/82* (2013.01); *B65G 2201/042* (2013.01); *B65G 2814/0314* (2013.01); *B65G 2814/0331* (2013.01)

(58) Field of Classification Search
CPC ......... B65G 15/08; B65G 15/30; B65G 15/60
See application file for complete search history.

(56) References Cited

U.S. PATENT DOCUMENTS

| | | | | |
|---|---|---|---|---|
| 2,861,675 | A * | 11/1958 | Cordis ................... | A01K 39/01 |
| | | | | 119/57.2 |
| 3,125,989 | A | 3/1964 | Cordis | |
| 4,395,973 | A | 8/1983 | Hall et al. | |
| 5,060,787 | A * | 10/1991 | Tingskog ............... | B65G 15/08 |
| | | | | 198/819 |
| 7,913,836 | B2 * | 3/2011 | Storch ................... | B65G 15/60 |
| | | | | 198/819 |
| 2002/0038757 | A1 | 4/2002 | Eberlc et al. | |
| 2011/0239948 | A1 | 10/2011 | Pirovano | |

FOREIGN PATENT DOCUMENTS

GB        2115364 A  *  9/1983  ............. B65G 15/08

OTHER PUBLICATIONS

International Search Report and Written Opinion dated Dec. 28, 2021 In Corresponding PCT Application: PCT/US2021/051927.

* cited by examiner

*Primary Examiner* — William R Harp
(74) *Attorney, Agent, or Firm* — Duane Morris LLP

(57) ABSTRACT

Provided is an improved animal feed distribution system and components, specifically tube belt conveyor system, that provides more efficient manner of delivering feed to the animals, such as poultry by using tube conveyor belt to distribute feed in a re-circulating loop.

13 Claims, 11 Drawing Sheets

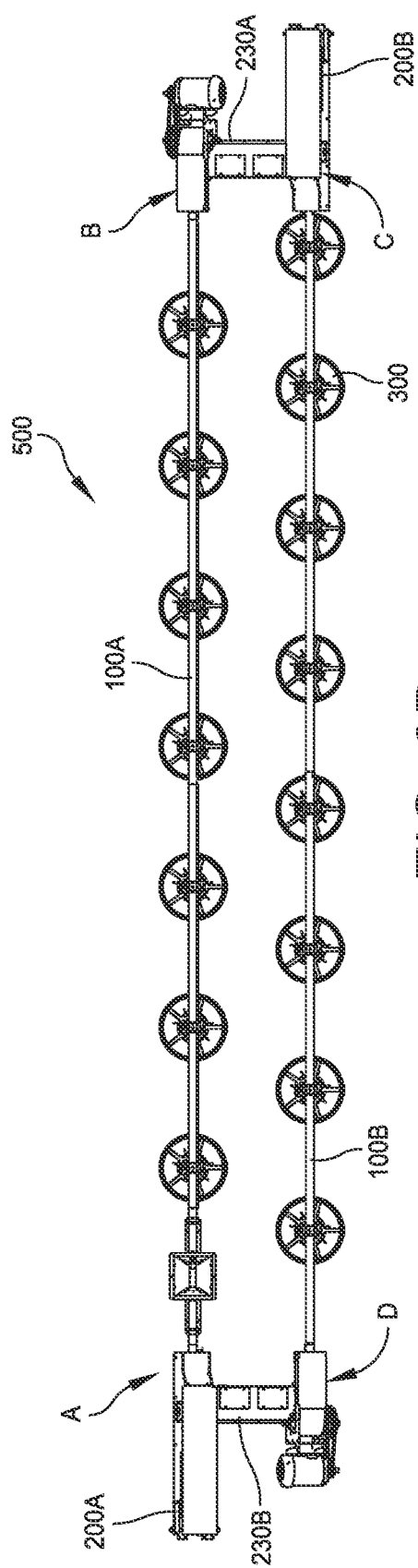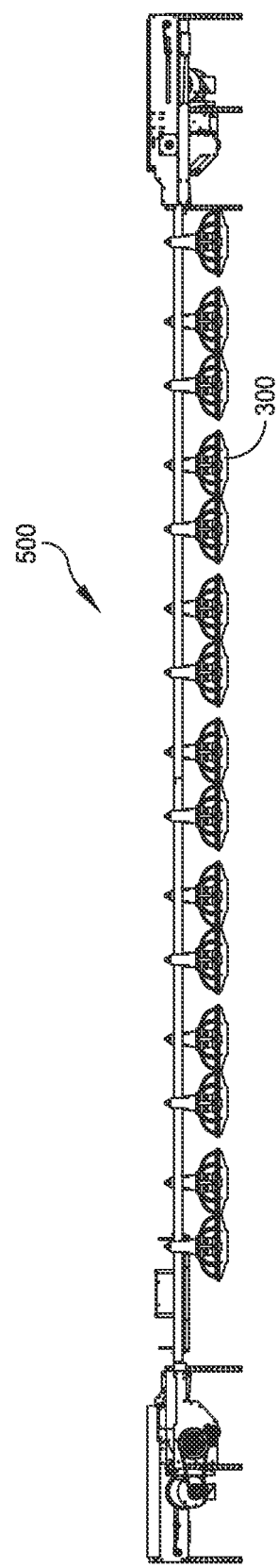
FIG. 3B
FIG. 3C

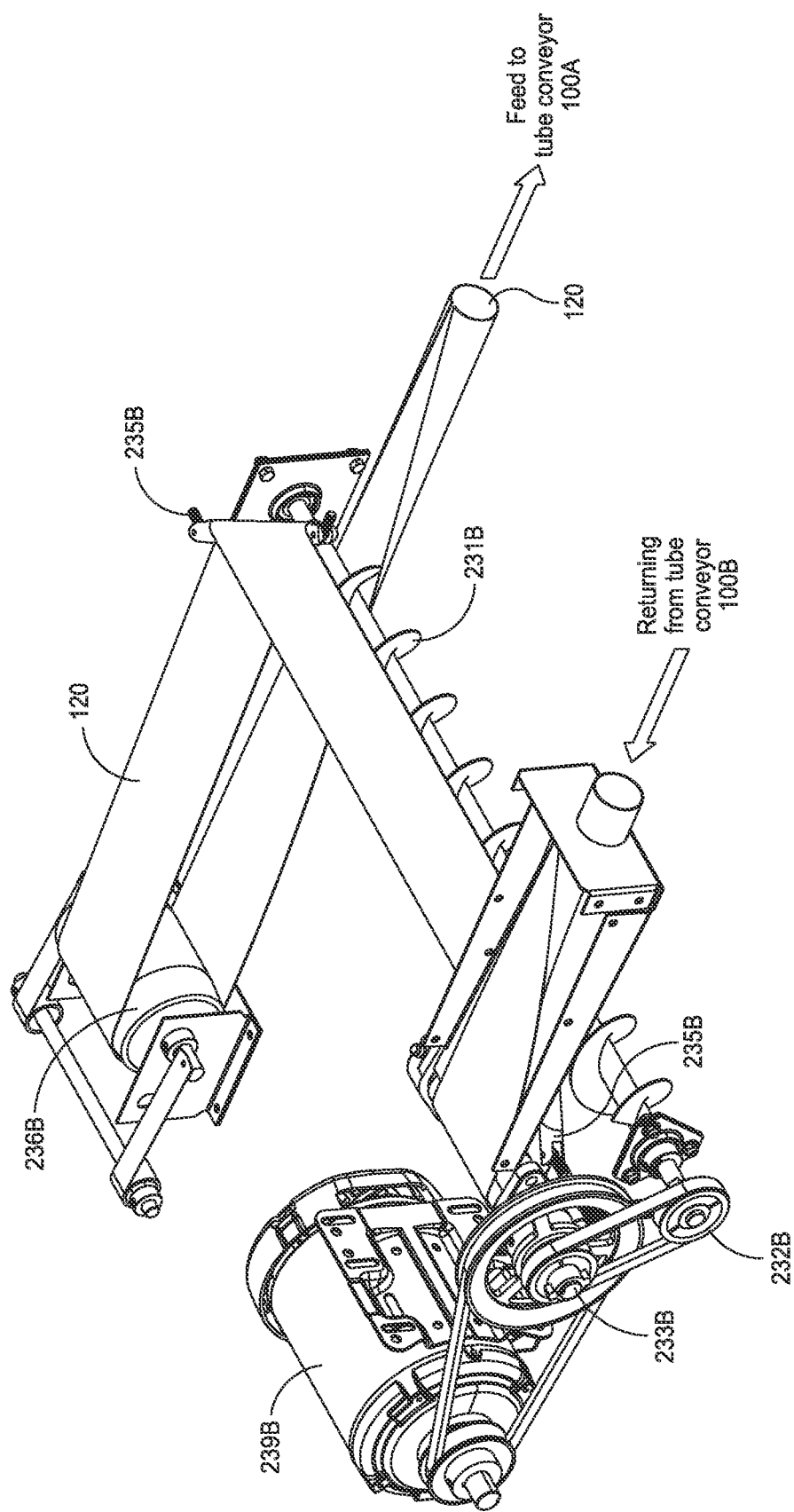

TUBE CONVEYOR SYSTEM

CROSS-REFERENCE TO RELATED APPLICATIONS

This application claims priority under 35 U.S.C. § 119(e) to U.S. Provisional Application No. 63/083,302, filed on Sep. 25, 2020, the entire contents of which are incorporated herein by reference.

FIELD

The present disclosure relates to material conveying systems.

SUMMARY

The present disclosure provides a conveyor system for distributing a particulate material in a continuous loop configuration. The conveyor system is particularly useful for distributing the particulate material to a plurality of receptacles that are sequentially arranged.

Disclosed herein is a material conveyance system comprising: two tube sections; a loop of conveyor belt having a first side and a second side; at least one driving mechanism that is configured to move the conveyor belt through the two tube sections; wherein the conveyor belt is arranged in a configuration that allows the conveyor belt to continuously loop through the two tube sections, whereby a portion of the conveyor belt is inside one of the tube sections and another portion of the conveyor belt is inside another of the tube sections, wherein the two tube sections are arranged in a non-coaxial relationship to each other so that they form two opposing sides of a quadrilateral, wherein the portion of the conveyor belt that is inside the two tube section is cupped by the tube, whereby when the conveyor belt is conveying some amount of material through the two tube sections, the material is carried on the first side of the conveyor belt in both of the two tube sections.

Also disclosed is a material conveying apparatus comprising: at least one tube section; a conveyor belt that is configured to travel through the at least one tube section, whereby a portion of the conveyor belt is inside the at least one tube section; at least one driving mechanism that is configured to move the conveyor belt through the at least one tube section; wherein the portion of the conveyor belt that is inside the at least one tube section is cupped by the tube, wherein the at least one tube section comprises a plurality of dispensing holes provided along at least a portion of the at least one tube section, and the conveyor belt comprises a plurality of holes provided along the length of the conveyor belt, whereby when the conveyor belt is conveying some amount of particulate material through the at least one tube section, an amount of particulate material is dispensed through any one of the plurality of dispensing holes in the tube section as the holes in the conveyor belt pass over the plurality of dispensing holes.

Also disclosed is an animal feed distribution system comprising: a tube conveyor comprising: at least one tube section; a conveyor belt loop that is looped through the at least one tube section, whereby a portion of the conveyor belt loop is inside the at least one tube section; at least one driving mechanism that is configured to move the conveyor belt loop through the at least one tube section; wherein the at least one tube section comprises a plurality of dispensing holes provided along at least a portion of the at least one tube section, and the conveyor belt loop comprises a plurality of holes provided along the length of the conveyor belt loop, whereby when the conveyor belt loop is conveying some amount of particulate material through the at least one tube section, an amount of particulate material is dispensed through any one of the plurality of dispensing holes in the tube section as the holes in the conveyor belt pass over the plurality of dispensing holes.

BRIEF DESCRIPTION OF THE DRAWINGS

The features of the embodiments described herein will be more fully disclosed in the following detailed description, which is to be considered together with the accompanying drawings wherein like numbers refer to like parts.

FIG. 3B is a top view of the loop conveyor system of FIG. 3A.

FIG. 3C is a side view of the loop conveyor system of FIG. 3A.

FIGS. 6A and 6B are isometric views of the internal conveyor drive components corresponding to the two ends of the loop conveyor system shown in FIGS. 5A and 5B, respectively.

DETAILED DESCRIPTION

Figure 1A:
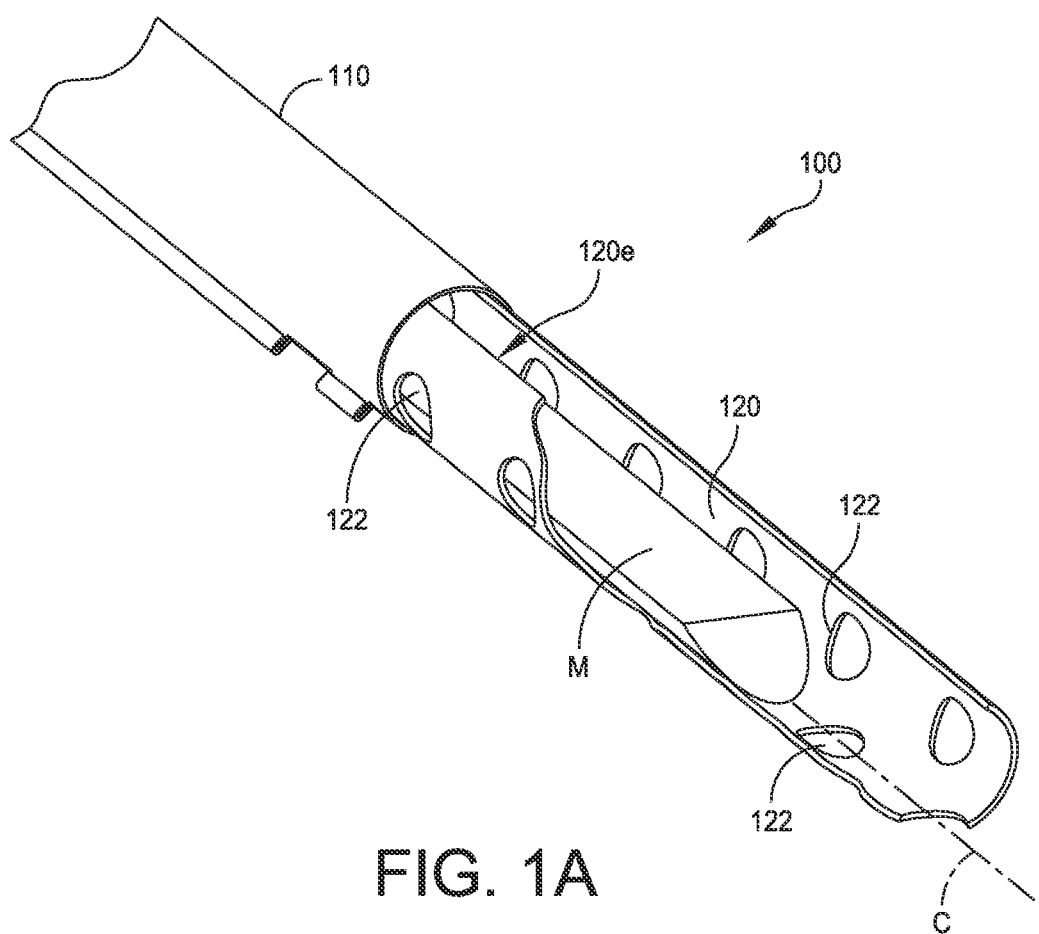
FIG. 1A is a partial cutaway isometric view of a tube conveyor according to an embodiment described herein.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 1B:
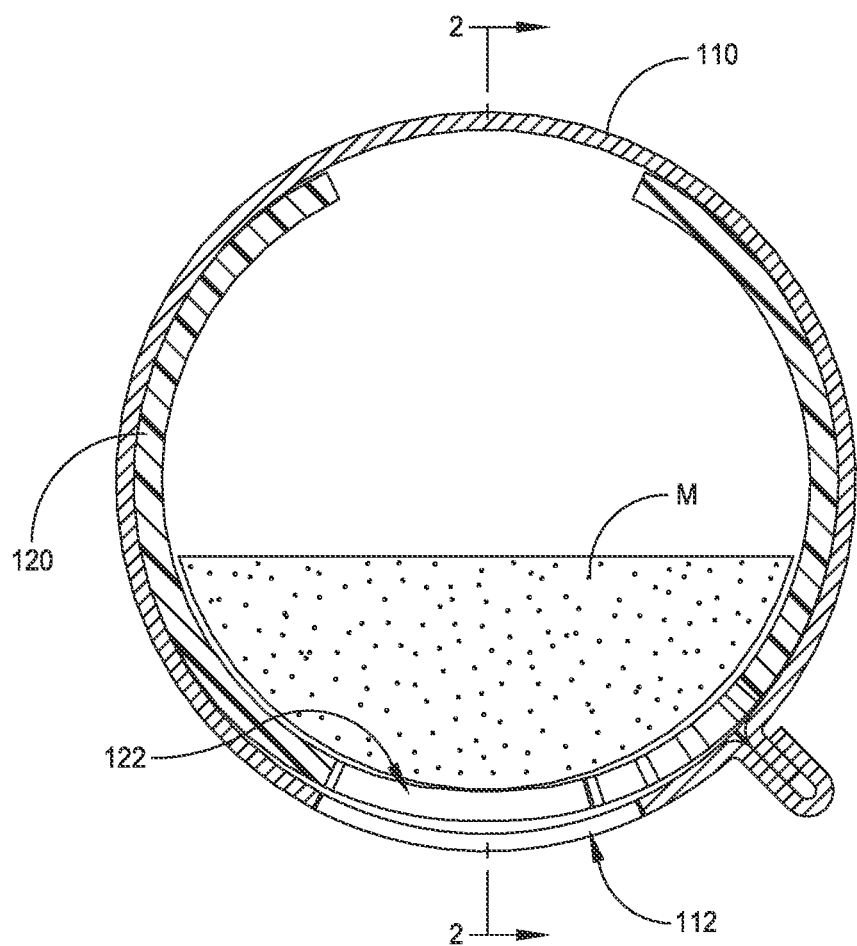
FIG. 1B is a sectional view of the tube conveyor of FIG. 1A where the section is taken orthogonal to the longitudinal axis of the tube conveyor.
Figure 2:
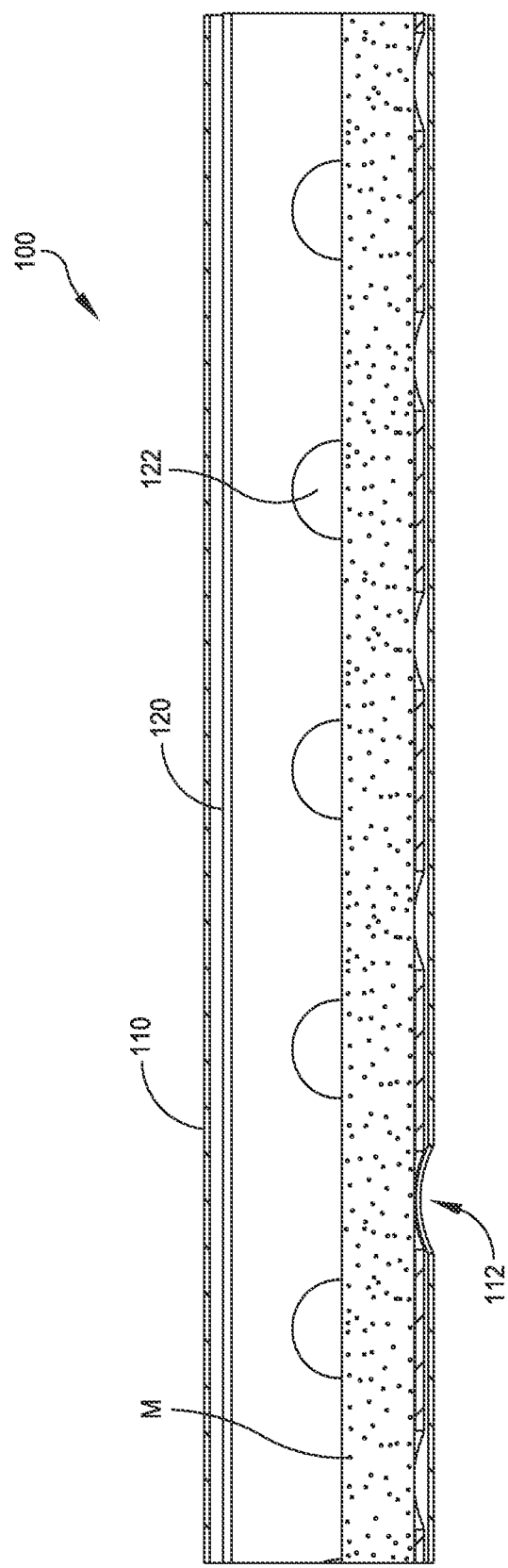
FIG. 2 is a sectional view of the tube conveyor of FIG. 1A where the section is taken along the longitudinal axis of the tube conveyor.

Referring to FIGS. 1A-2, described herein is a conveying apparatus that is a tube conveyor 100. The tube conveyor 100 comprises at least one tube section 110 and a conveyor belt 120 that is configured to move through the at least one tube section 110. FIG. 1A which is a partial cutaway view of the tube conveyor 100 shows that the portion of the conveyor belt 120 that is inside the at least one tube section 110 is cupped by the tube. As the conveyor belt 120 moves through the tube section 110 the cupped shape of the conveyor belt 120 is helpful in carrying an amount of material M. The material M can be one of many types of materials that can be transported. For example, the material M can be particulate material such as grains, animal feed, etc. At least one driving mechanism is provided that is configured to move the conveyor belt 120 through the at least one tube section 110. FIG. 1B which is a cross-sectional view of the tube conveyor 100 also illustrates this arrangement.

In some embodiments, the conveyor belt 120 can be provided as an endless loop. A portion of the endless loop of the conveyor belt 120 is looped through the at least one tube section 110.

FIGS. 1B and 2 shows that the at least one tube section 110 comprises a plurality of dispensing holes 112 provided along at least a portion of the at least one tube section 110. FIGS. 1A and 2 also show that the conveyor belt 120 comprises a plurality of holes 122 provided along the length of the conveyor belt loop. The plurality of dispensing holes 112 can be provided along the bottom of the tube section 110. Preferably, the dispensing holes 112 on the tube section 110 are positioned to be over the target receptacles so that the material M can be dispensed through the dispensing holes 112 and into the target receptacles.

When the conveyor belt 120 is moving through the tube section 110 and conveying some amount of particulate material M through the at least one tube section 110, an amount of particulate material is dispensed through each of the plurality of dispensing holes 112 in the tube section 110 as any one of the holes 122 in the conveyor belt 120 comes into at least a partial overlapping alignment with each of the dispensing holes 112 as the holes 122 in the conveyor belt 120 pass over any one of the plurality of dispensing holes 112. The holes 122 in the conveyor belt 120 and the dispensing holes 112 do not necessarily have to fully overlap at any point in time. Just partial overlap of the holes 122 and a dispensing hole 112 will allow some amount of the particulate material M to dispense through the dispensing hole 112.

In some embodiments, the plurality of dispensing holes 112 in the at least one tube section 110 are provided along the bottom of the tube section 110. Referring to FIG. 1A, the plurality of holes 122 in the conveyor belt 120 are provided at least along the center line C of the conveyor belt 120 as well as additional holes away from the center of the belt closer to the edges 120e of the conveyor belt 120. This arrangement of the holes 122 in the conveyor belt 120 maximizes the hole coverage along the width of the conveyor belt 120. This arrangement ensures that there will be some overlap between the row of dispensing holes 112 along the bottom of the tube 110 and some of the holes 122 in the conveyor belt 120 even when the center line C of the conveyor belt 120 is not in alignment with the row of dispensing holes 112 in the tube 110. Such misalignment can happen as the conveyor belt 120 is driven through the tube 110 simply because the conveyor belt 120 is not mechanically linked to the tube 110. Additionally, the arrangement of the holes 122 discussed above can also be helpful in situations where the tube 110 is installed with curved sections. The conveyor belt 120 may not always remain in linear alignment with the tube 110 as the conveyor belt 120 moves through the curved portions of the tube 110.

In some embodiments, the tube conveyor 100 of the present disclosure can be applied to an animal feed distribution system. An example of such system is a poultry feed distribution system 500 illustrated in FIG. 3A. The poultry feed distribution system 500 comprises at least one tube conveyor 100 described above. In the poultry feed distribution system 500, two tube conveyors 100A and 100B are provided. In this example, the conveyor belt 120 is provided as an endless loop of conveyor belt that is looped through the two tube conveyors 100A and 100B. The conveyor belt 120 is not visible in FIG. 3A because the conveyor belt 120 is inside the two tube conveyors 100A, 100B. The two tube conveyors 100A and 100B are connected by two belt drive assemblies 200A and 200B.

The belt drive assemblies 200A, 200B includes the components that drive the endless loop of conveyor belt 120 in its looped path. Each of the belt drive assemblies 200A, 200B also comprises cross auger troughs 230A, 230B, respectively, that are configured to move the material M between the two tube conveyors 100A and 100B so that the material M can travel in a looped path along with the conveyor belt 120.

Figure 3A:
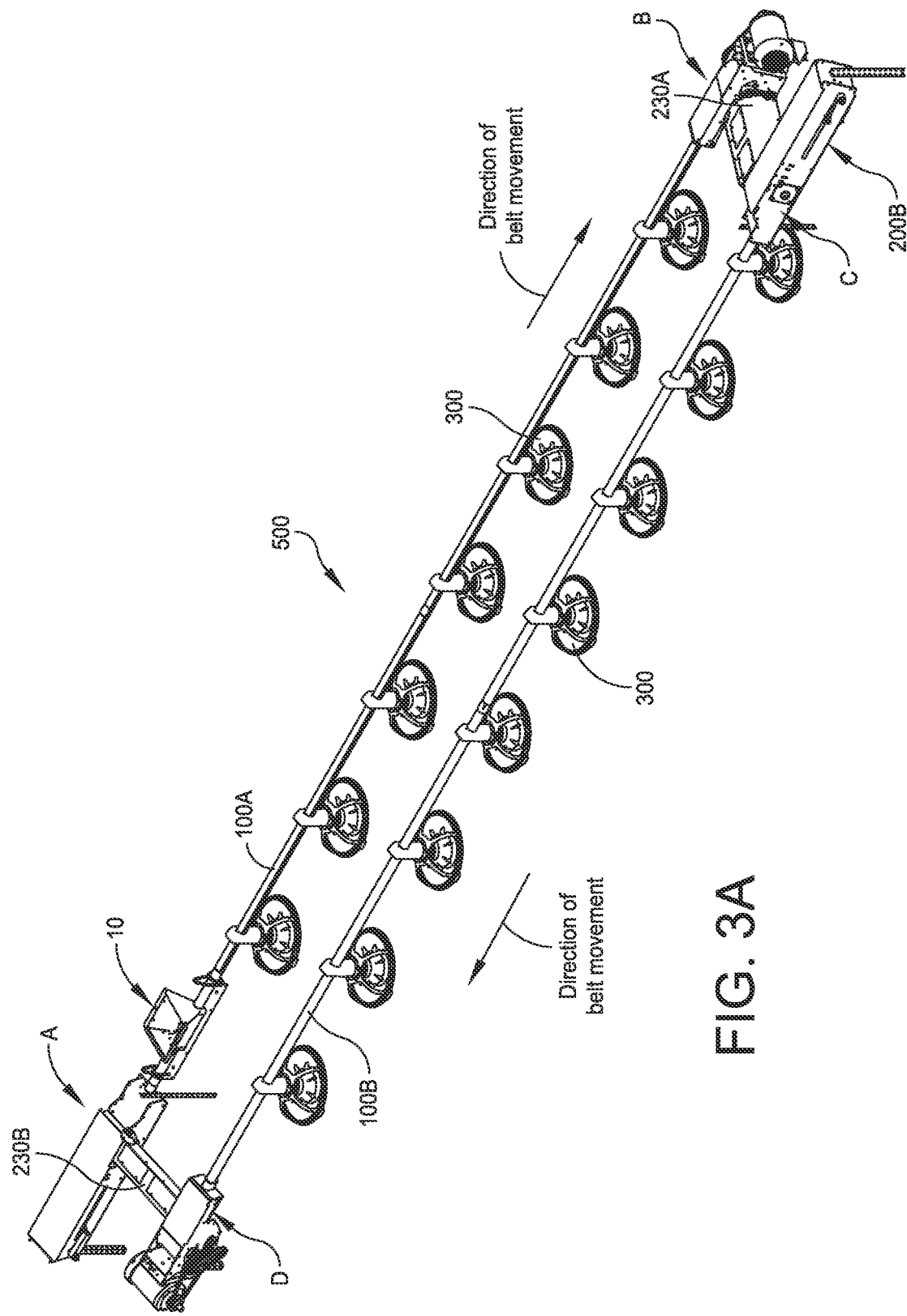
FIG. 3A is an isometric view of a loop conveyor system utilizing the tube conveyor shown in FIG. 1A.

The looped path of the conveyor belt 120 and the material M is identified in FIG. 3A by the arrows labeled as "Direction of belt movement." For example, starting from the arbitrary point A noted in FIG. 3A identifying the starting end of the tube conveyor 100A, the tube conveyor 100A moves the material M from point A to point B. Along the way, some amount of the material M is dispensed into each of the feeder pans 300. At point B, if there are any material M remaining in the tube conveyor 100A, an auger 231B (see FIG. 6A) inside the cross auger trough 230A carries the material M over to the starting end (represented by the point C) of the second tube conveyor 100B. Then, the second tube conveyor 100B moves the feed material from point C to point D. Along the way, some amount of the material M is dispensed into each of the feeder pans 300 that are connected to the second tube conveyor 100B. At point D, if there are any material M remaining in the tube conveyor 100B, the cross auger trough 230B carries the material M over to the starting end of the first tube conveyor 100A.

The material M can be added to the feed distribution system 500 and onto the conveyor belt 120 at any appropriate point along the loop of the conveyor belt 120. The material M can be added to the feed distribution system 500 through an intake opening 10 provided in the tube conveyor 100A. In some embodiments of the feed distribution system 500, the intake opening 10 is in the form of a hopper attached to the tube section 110 and can be used as a funnel for dropping the material M by gravity feed onto the conveyor belt 120 passing below the hopper 10. In the example illustrated in FIG. 3A, the hopper 10 is located on the tube conveyor 100A but the hopper 10 can be just as easily located on the other tube conveyor 100B in the feed distribution system 500.

Figure 7A:
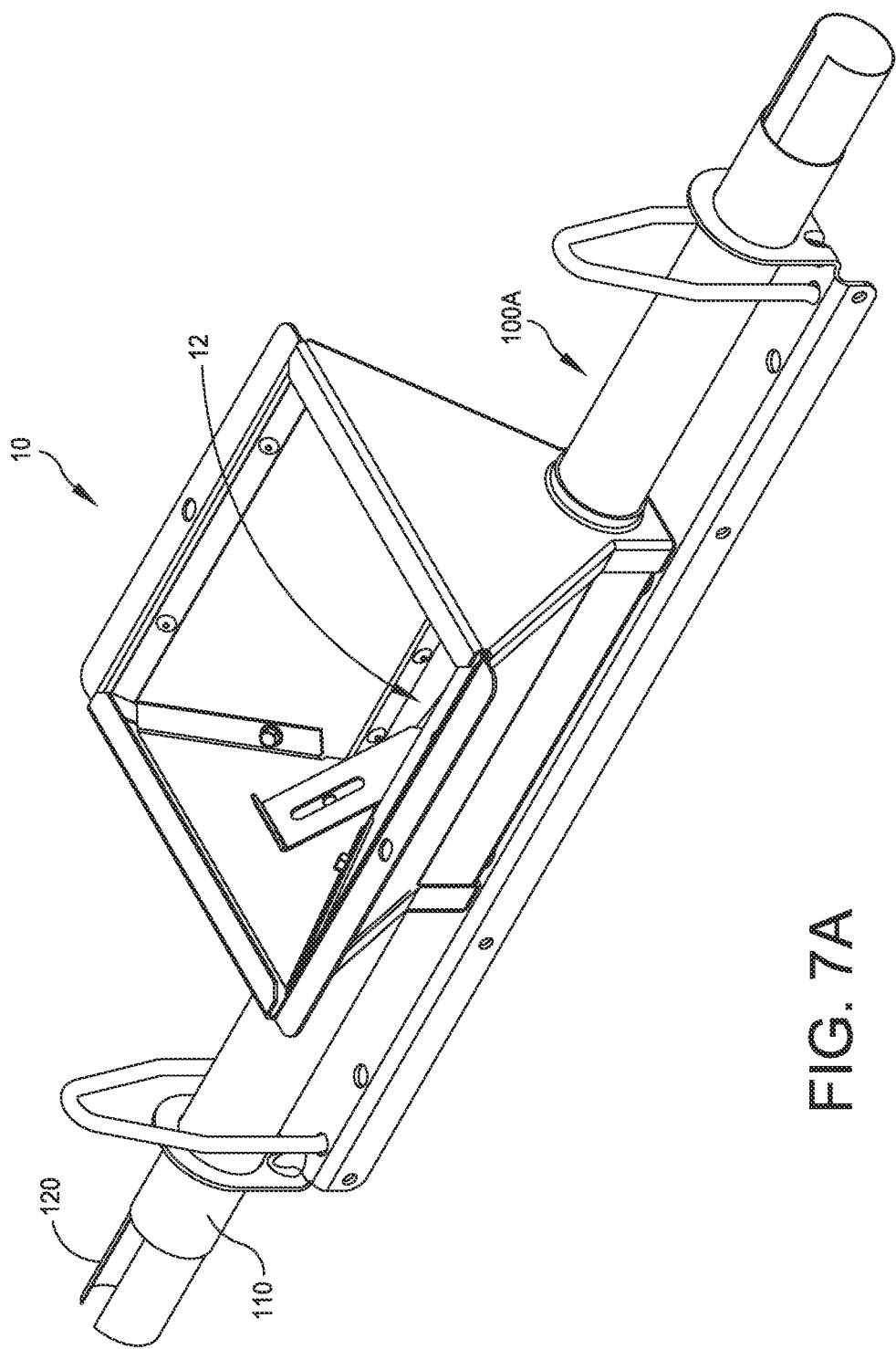
FIG. 7A is an isometric view of a hopper provided in the feed distribution system of the present disclosure.
Figure 7B:
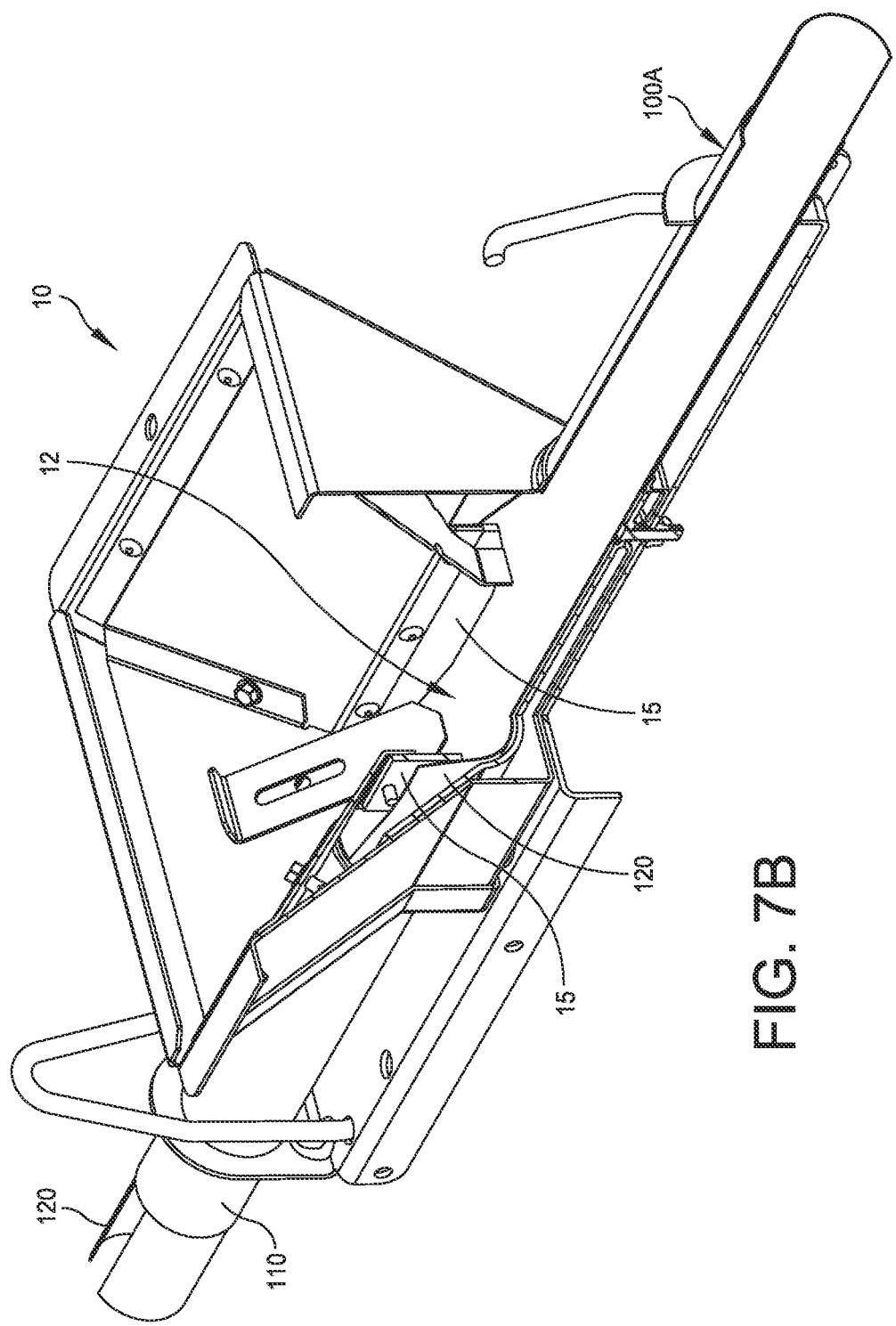
FIG. 7B is an isometric cross-section view of the hopper of FIG. 7A.

FIGS. 7A and 7B provide detailed views of the hopper 10. FIG. 7A is an isometric view. The hopper 10 is attached to the tube section 110. The hopper 10 comprises an opening 12 that provides access to the interior of the tube section 110. FIG. 7B is an isometric cross-section view of the hopper 10. The conveyor belt 120 is held open as it travels below the hopper 10. The hopper can comprise at least two guides 15 that holds the conveyor belt 120 open. The portion of the tube section 110 that engages with the hopper 10 can have its top portion flared open so that the opening 12 of the hopper 10 is in communication with the interior space of the tube section 110 so that the material M can be gravity fed from the hopper 10 and drop onto the conveyor belt 120.

In addition to moving the material M between the two tube conveyors 100A, 100B, the two cross auger troughs 230A, 230B can also provide the structures connecting the two tube conveyors 100A, 100B as shown in FIG. 3A.

The dispensing of the material M at each of the poultry feeding pans 300 is via the corresponding dispensing hole 112 provided in the tube section 110 of the tube conveyors as explained in connection with FIGS. 1A-2. Each of the poultry feeding pans 300 is located under the dispensing holes 112 provided in the tube section 110.

FIG. 3B shows a top view of the loop conveyor system 500. FIG. 3C shows a side view of the loop conveyor system 500.

Figure 5B:
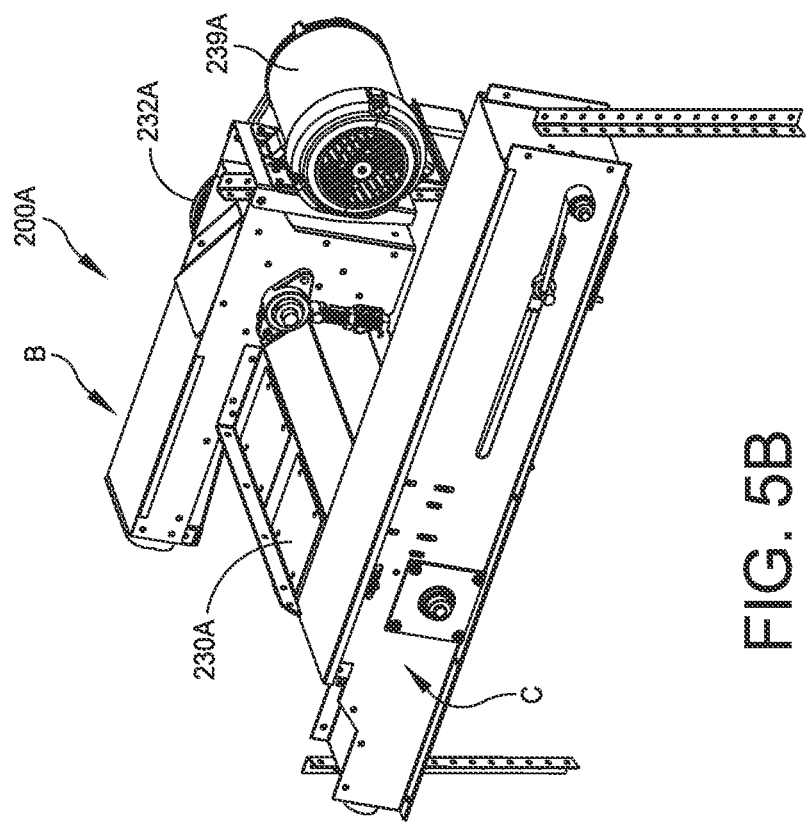
FIGS. 5A and 5B are isometric views of two ends of the loop conveyor system of FIG. 4.
Figure 5A:
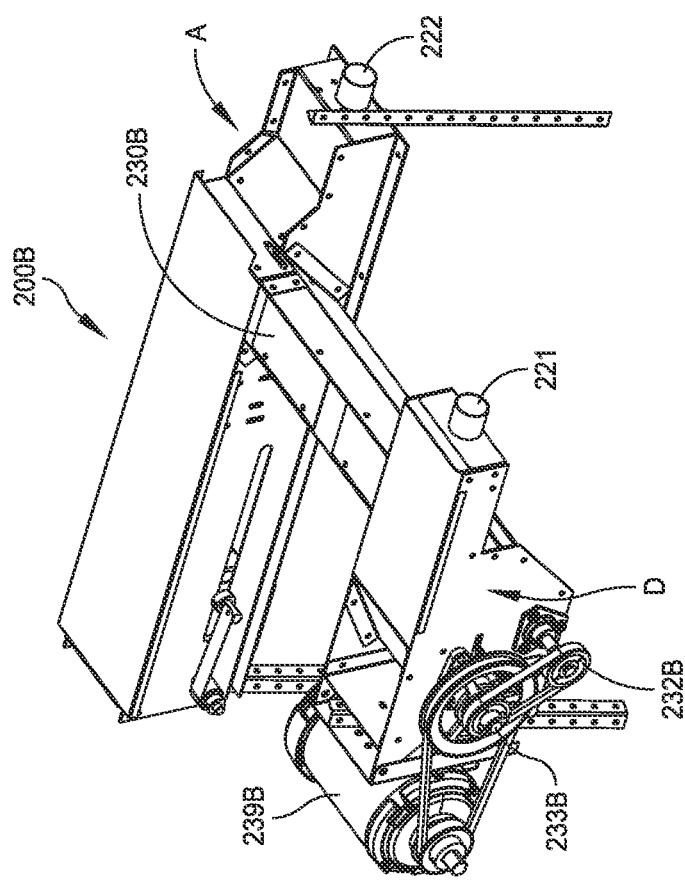

FIGS. 5A and 5B are close up views of the belt drive assemblies 200A and 200B. Referring to FIG. 5A which shows the cross auger trough 230B, the belt outlet 222 near the point A is where the cross auger trough assembly 230B connects to the tube section 110 of the tube conveyor 100A. The belt inlet 221 near the point D is where the cross auger trough assembly 230B connects to the tube section 110 of the second tube conveyor 100B. Also illustrated in FIG. 5A are the drive motor 239B for driving the conveyor belt 120 in the looped path described above. In some embodiments, the feed distribution system 500 can be operated with one drive motor 233B. In other embodiments, the feed distribution system 500 can be operated with two drive motors. The second drive motor 239A is shown in FIG. 5B.

Figure 4:
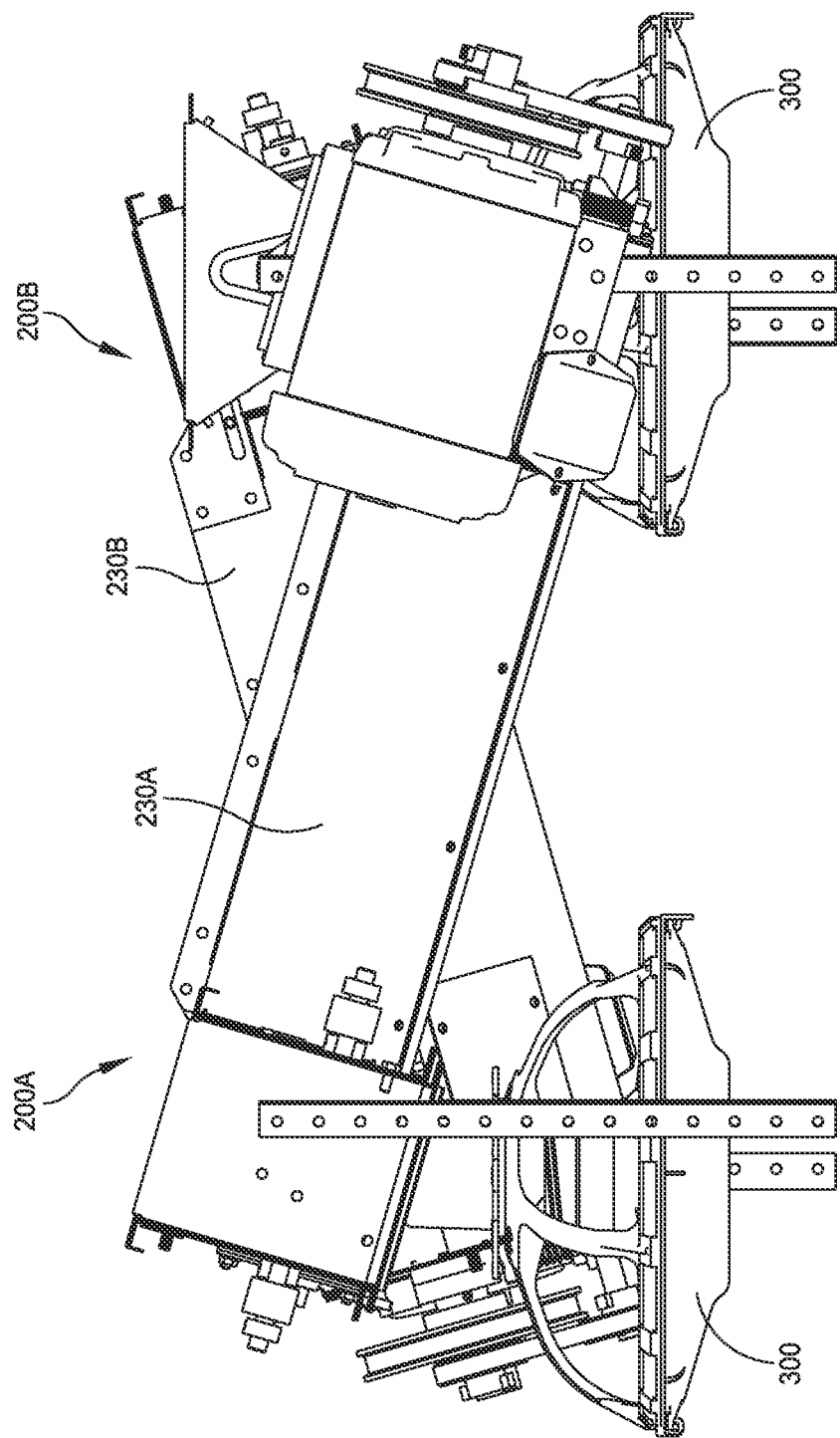
FIG. 4 is an end view of the loop conveyor system of FIG. 3.

FIG. 6A is an isometric view of the internal components of the belt drive assembly 200B. The belt drive assembly 200B comprises a combination of turn bars 235B and idler wheel 236B to turn and reorient the conveyer belt 120 returning from the tube conveyor 100B and feed it back out to the tube conveyor 100A. During the turning sequence, any material M that is remaining on the conveyor belt 120 returning from the tube conveyor 100B is diverted into the cross auger trough 230B. At this location, where the conveyor belt 120 is exiting the tube section 110 of the tube conveyor 100B, the cross auger 231B and its cross auger trough 230B are located below the conveyor belt 120 to facilitate diverting of the material, being conveyed on the top surface of the conveyor belt 120, to the cross auger 231B. The cross auger trough 230B catches the material M. Then the cross auger 231B which is positioned inside the cross auger trough 230B transfers the material M to the conveyor belt 120 that is about to exit the outlet end 222 of the belt drive assembly 200B to the tube conveyor 100A. After the turning sequence, the conveyor belt 120 is now oriented correctly to be deployed to the tube conveyor 100A. As shown in the end view in FIG. 4, the cross auger trough 230B and the cross auger 231B are positioned at an incline to drop the material M onto the conveyor belt 120 that is about to exit the outlet end 222. In this example, a drive motor 239B is provided for driving the movement of the conveyor belt 120 as well as the cross auger 231B. The belt drive assembly 200B comprises a main drive pulley 233B which engages the drive mother 239B for driving the conveyor belt 120. The belt drive assembly 200B further comprises a cross auger drive pulley 232B for driving the cross auger 231B.

Figure 6B:
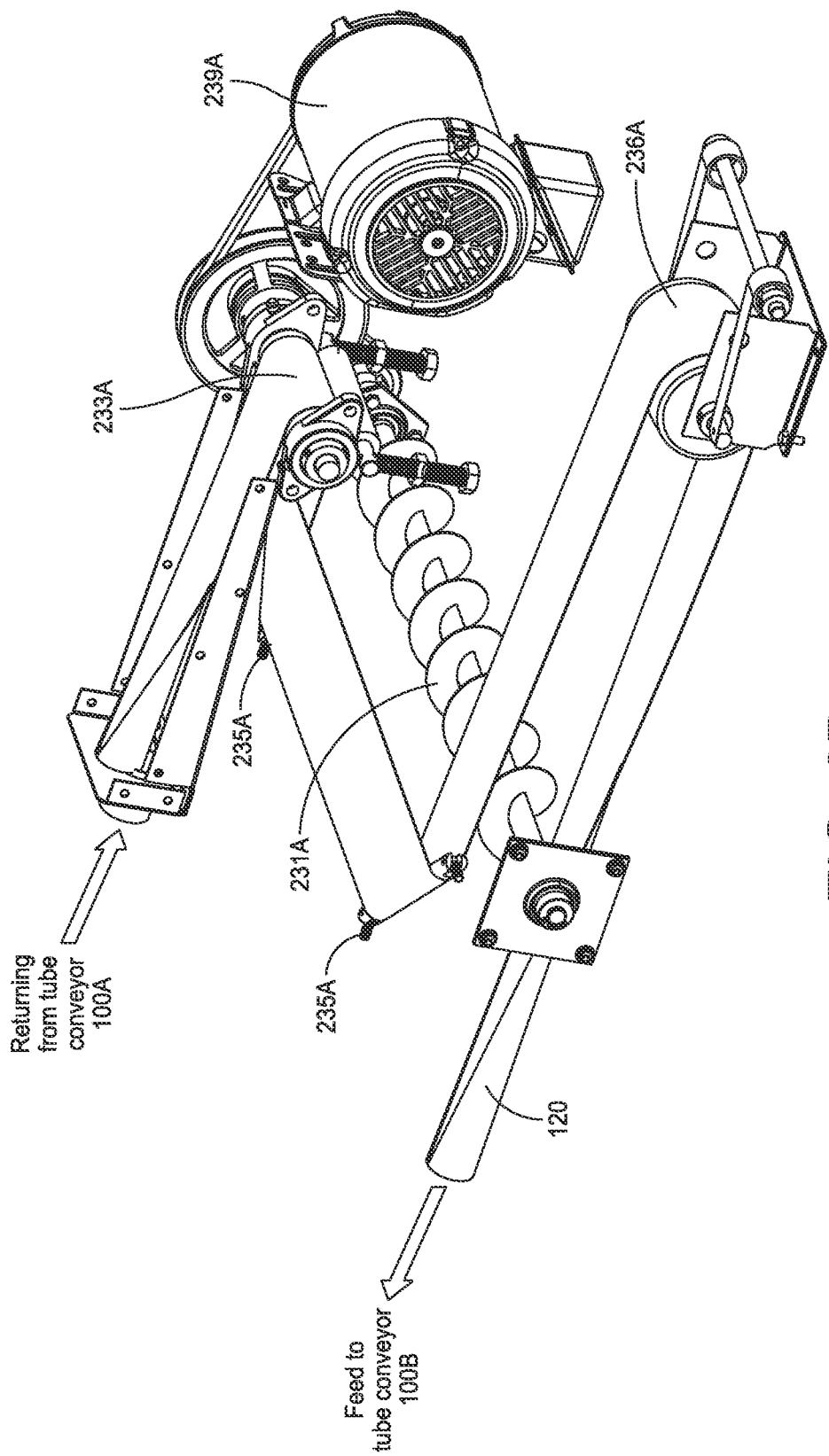

Analogously, at the opposite end of the feed distribution system 500, the same process sequence in the opposite direction occurs at the belt drive assembly 200A. The internal components of the belt drive assembly 200A are shown in FIG. 6B. The conveyor belt 120 returning from the tube conveyor 100A is turned and redirected to feed back out to the tube conveyor. The belt drive assembly 200A comprises a combination of turn bars 235A and idler wheel 236A to perform the turning and reorienting of the conveyor belt 120. In this example, a drive motor 239A is provided for driving the movement of the conveyor belt 120 as well as the cross auger 231A.

The particular arrangement of the tube conveyor 100 and the belt drive assemblies 200A, 200B comprising the cross augers 231A, 231B, cross auger troughs 230A, 230B, and the belt turn bars 235A, 235B, etc., provides a novel horizontal re-circulating loop system that conveys animal feed or other particulate material in an endless loop while providing a configuration to dispense an amount of the particulate material at desired dispensing points along the re-circulating loop.

According to some embodiments of the present disclosure, provided is a material conveyance system that comprises, two tube sections, an endless loop of conveyor belt having a first side and a second side, at least one driving mechanism that is configured to move the conveyor belt through the two tube sections, where the conveyor belt is arranged in a configuration that allows the conveyor belt to continuously loop through the two tube sections, whereby a portion of the conveyor belt is inside one of the tube sections and another portion of the conveyor belt is inside another of the tube sections. The two tube sections are arranged in a non-coaxial relationship to each other so that they form two opposing sides of a quadrilateral. The portion of the conveyor belt that is inside the two tube sections is cupped by the tube. Thus, when the conveyor belt is conveying an amount of material through the two tube sections, the material is carried on the first side of the conveyor belt in both of the two tube sections.

In some embodiments, the material conveyance system can further comprise two cross augers that are arranged to form two other sides of the quadrilateral. The two cross augers transport the material between the two tube sections.

In some embodiments, the material conveyance system can further comprise a set of a plurality of turnbars provided near each ends of the two tube sections. The turnbars are rollers that turn and change the direction of the conveyor belt coming out of one tube section to enter the other of the two tube sections. In some embodiments, when the conveyor belt is conveying some amount of material through the two tube sections, the material being conveyed by the conveyor belt exiting one tube section is diverted into a cross auger and the cross auger transport the material to the conveyor belt entering the other tube section.

According to some embodiments, also disclosed is a material conveying apparatus that comprises at least one tube section, a conveyor belt that is configured to travel through the at least one tube section, whereby a portion of the conveyor belt is inside the at least one tube section, at least one driving mechanism that is configured to move the conveyor belt through the at least one tube section, where the portion of the conveyor belt that is inside the at least one tube section is cupped by the tube, where the at least one tube section comprises a plurality of dispensing holes provided along at least a portion of the at least one tube section, and the conveyor belt comprises a plurality of holes provided along the length of the conveyor belt. When the conveyor belt is conveying some amount of particulate material through the at least one tube section, an amount of particulate material is dispensed through any one of the plurality of dispensing holes in the tube section as the holes in the conveyor belt pass over any of the plurality of dispensing holes. In some embodiments of the material conveying apparatus, the conveyor belt is an endless conveyor belt loop that is looped through the at least one tube section. In some embodiments of the material conveying apparatus, the plurality of dispensing holes in the at least one tube section are provided along the bottom of the tube section and the plurality of holes in the conveyor belt loop are provided in a configuration that provides more than one hole across the conveyor belt's width.

According to some embodiments, also disclosed is an animal feed distribution system that comprises a tube conveyor. The tube conveyor comprises at least one tube section, an endless conveyor belt loop that is looped through the at least one tube section, whereby a portion of the conveyor belt loop is inside the at least one tube section. The tube conveyor also includes at least one driving mechanism that is configured to move the endless conveyor belt loop through the at least one tube section, where the at least one tube section comprises a plurality of dispensing holes provided along at least a portion of the at least one tube section, and the conveyor belt loop comprises a plurality of holes provided along the length of the conveyor belt loop, whereby when the conveyor belt loop is conveying some amount of particulate material through the at least one tube section, an amount of particulate material is dispensed through any one of the plurality of dispensing holes in the tube section as the holes in the conveyor belt pass over the plurality of dispensing holes. The portion of the conveyor belt loop that is inside the at least one tube section is cupped by the tube. In some embodiments of the animal feed distribution system, the plurality of dispensing holes in the at least one tube section are provided along the bottom of the tube section and the plurality of holes in the conveyor belt loop are provided in a configuration that provides more than one hole across the conveyor belt's width.

It will be understood that the foregoing description is of exemplary embodiments of this invention, and that the invention is not limited to the specific forms shown. Modifications may be made in the design and arrangement of the elements without departing from the scope of the invention.

What is claimed is:

1. A material conveyance system comprising:
   two tube sections;
   a loop of conveyor belt, wherein the conveyor belt has a first side and a second side;
   at least one driving mechanism that is configured to move the conveyor belt through the two tube sections;
   wherein the conveyor belt is arranged in a configuration that allows the conveyor belt to continuously loop through the two tube sections, whereby a portion of the conveyor belt is inside one of the tube sections and another portion of the conveyor belt is inside another of the tube sections,
   wherein the two tube sections are arranged in a non-coaxial relationship to each other so that they form two opposing sides of a quadrilateral,
   wherein the portion of the conveyor belt that is inside the two tube sections is cupped by the tube,
   whereby when the conveyor belt is conveying some amount of material through the two tube sections, the material is carried on the first side of the conveyor belt in both of the two tube sections, wherein each of the two tube sections comprises a plurality of dispensing holes provided along at least a portion of the tube section, and the conveyor belt comprises a plurality of holes provided along at least a portion of the loop of the conveyor belt.

2. The material conveyance system of claim 1, further comprising two cross augers that are arranged to form two other sides of the quadrilateral, wherein the two cross augers transport the material between the two tube sections.

3. The material conveyance system of claim 2, wherein when the conveyor belt is conveying some amount of material through the two tube sections, the material being conveyed by the conveyor belt exiting one tube section is diverted into a cross auger and the cross auger transport the material to the conveyor belt entering the other tube section.

4. The material conveyance system of claim 1, further comprising a set of a plurality of turnbars provided near each ends of the two tube sections, wherein the turnbars turn and change the direction of the conveyor belt coming out of one tube section to enter the other of the two tube sections.

5. The material conveyance system of claim 1, wherein the material is a particulate material.

6. A material conveying apparatus comprising:
   at least one tube section;
   a conveyor belt that is configured to travel through the at least one tube section, whereby a portion of the conveyor belt is inside the at least one tube section;
   at least one driving mechanism that is configured to move the conveyor belt through the at least one tube section;
   wherein the portion of the conveyor belt that is inside the at least one tube section is cupped by the tube,
   wherein the at least one tube section comprises a plurality of dispensing holes provided along at least a portion of the at least one tube section, and the conveyor belt comprises a plurality of holes provided along at least a portion of the conveyor belt's length,
   whereby when the conveyor belt is conveying some amount of material through the at least one tube section, an amount of the material is dispensed through any one of the plurality of dispensing holes in the tube section as the holes in the conveyor belt pass over the plurality of dispensing holes.

7. The material conveying apparatus of claim 6, wherein the conveyor belt is a conveyor belt loop that is looped through the at least one tube section.

8. The material conveying apparatus of claim 6, wherein the plurality of dispensing holes in the at least one tube section are provided along the bottom of the tube section and the plurality of holes in the conveyor belt loop are provided in a configuration that provides more than one hole across the conveyor belt's width.

9. The material conveying apparatus of claim 6, wherein the material is a particulate material.

10. An animal feed distribution system comprising:
    a tube conveyor comprising:
      at least one tube section;
      a conveyor belt loop that is looped through the at least one tube section, whereby a portion of the conveyor belt loop is inside the at least one tube section;
      at least one driving mechanism that is configured to move the conveyor belt loop through the at least one tube section;
    wherein the at least one tube section comprises a plurality of dispensing holes provided along at least a portion of the at least one tube section, and the conveyor belt loop comprises a plurality of holes provided along at least a portion of the conveyor belt loop, whereby when the conveyor belt loop is conveying some amount of material through the at least one tube section, an amount of the material is dispensed through any one of the plurality of dispensing holes in the tube section as the holes in the conveyor belt loop pass over the plurality of dispensing holes.

11. The animal feed distribution system of claim 10, wherein the portion of the conveyor belt loop that is inside the at least one tube section is cupped by the tube.

12. The animal feed distribution system of claim 11, wherein the plurality of dispensing holes in the at least one tube section are provided along the bottom of the tube section and the plurality of holes in the conveyor belt loop are provided in a configuration that provides more than one hole across the conveyor belt's width.

13. The animal feed distribution system of claim 10, wherein the material is a particulate material.

* * * * *